(No Model.) 6 Sheets—Sheet 4.

P. HANSON.
SELF BINDING HARVESTER.

No. 503,283. Patented Aug. 15, 1893.

Witnesses.
Arthur Johnson
N. G. Kennedy

Inventor.
Paul Hanson
By Phil T. Dodge atty (No Model.)

P. HANSON.
SELF BINDING HARVESTER.

No. 503,283.　　　　　　　Patented Aug. 15, 1893.

Witnesses.
Arthur Johnson
W. R. Kennedy

Inventor
Paul Hanson
By Phil. T. Dodge
Atty

UNITED STATES PATENT OFFICE.

PAUL HANSON, OF CHICAGO, ILLINOIS, ASSIGNOR TO THE WILLIAM DEERING & COMPANY, OF SAME PLACE.

SELF-BINDING HARVESTER.

SPECIFICATION forming part of Letters Patent No. 503,283, dated August 15, 1893.

Application filed January 16, 1890. Serial No. 337,065. (No model.)

*To all whom it may concern:*

Be it known that I, PAUL HANSON, of Chicago, in the county of Cook and State of Illinois, have invented certain new and useful Improvements in Self-Binding Harvesters, of which the following is a full description, reference being had to the accompanying drawings, in which—

The objects of my invention are first, to improve the construction of folding harvesters, in which the platform and reel are folded upward to reduce the width of the machine, with the view of enabling the parts to be folded into compact form and safely secured in folded position: second to improve the means for effecting the vertical adjustment of the grain platform and cutting mechanism to vary the height of cut, with the view of conveniently effecting the various adjustments and securing the parts in adjusted position.

In the drawings A. and A' are the main supporting wheels, each clutched by ratchet and pawl to the main axle $A^2$ by the well-known means found in various mowers; the said ratchet and pawl being located one on the cheek pieces $A^3$, and the other on the hub of the wheel $A^4$. It is immaterial whether the ratchet be on the cheek piece and the pawl on the wheel hub, or the reverse. Upon the axle I secure the large gear $A^5$, and also mount the bearings $A^6$ and $A^7$. Upon these two bearings I secure the main frame, which consists of the beam $A^8$ and the angle iron $A^9$, each bolted to the said bearings by means of bolts passing through lugs cast upon them. The angle bar $A^9$ is bolted at its rear to the sill $A^8$, and passes forward and stubbleward to the bearing $A^7$, then forward to a point in front of the machine so as to form a suitable pivot for the tongue brace. The sill $A^8$ extends rearward from the axle and forms a support for the gearing, and forward to a point substantially in line with the forward end of the angle bar $A^9$. The tongue $A^{10}$ I place substantially in line with the sill $A^8$, and pivot it to the front end thereof, by means of a suitable pivot bolt passing through the forward end of said sill and through the splice pieces $A^{12}$, which are bolted to the butt end of the tongue.

$A^{13}$ is the tongue brace bolted to the said tongue at some distance forward from the butt end, and extending backward and stubbleward, and provided with a hook $A^{14}$, which pivots to the bar $A^9$.

$A^{15}$ is a bar of iron bolted to the sill $A^8$, and extending stubbleward, where it is bolted to the angle bar $A^9$. The said angle bar $A^9$, the bar $A^{15}$, and the sill $A^8$, form a triangular frame, mounted upon the main axle by means of the bearings $A^6$ and $A^7$, and forming also, by the forward extensions of the sill $A^8$ and bar $A^9$, a suitable pivoting point for the tongue.

Upon the stubble end of the main axle, outside of the supporting wheel A, I place a bearing B, providing it with a suitable lug $b$.

From this bearing, through the instrumentality of the arm B', I support the sheaf carrier.

B² is a support to which the fingers B³ of the carrier are secured. This support is connected at or near its mid-length to the lug $b$ and in order that the carrier may not rock on its support, I connect to the bar A¹⁵ a bar B⁴ and pass it stubbleward and connect it to the bar B² at its front end.

The carrier not being claimed herein need not be described in detail.

Figure 1:
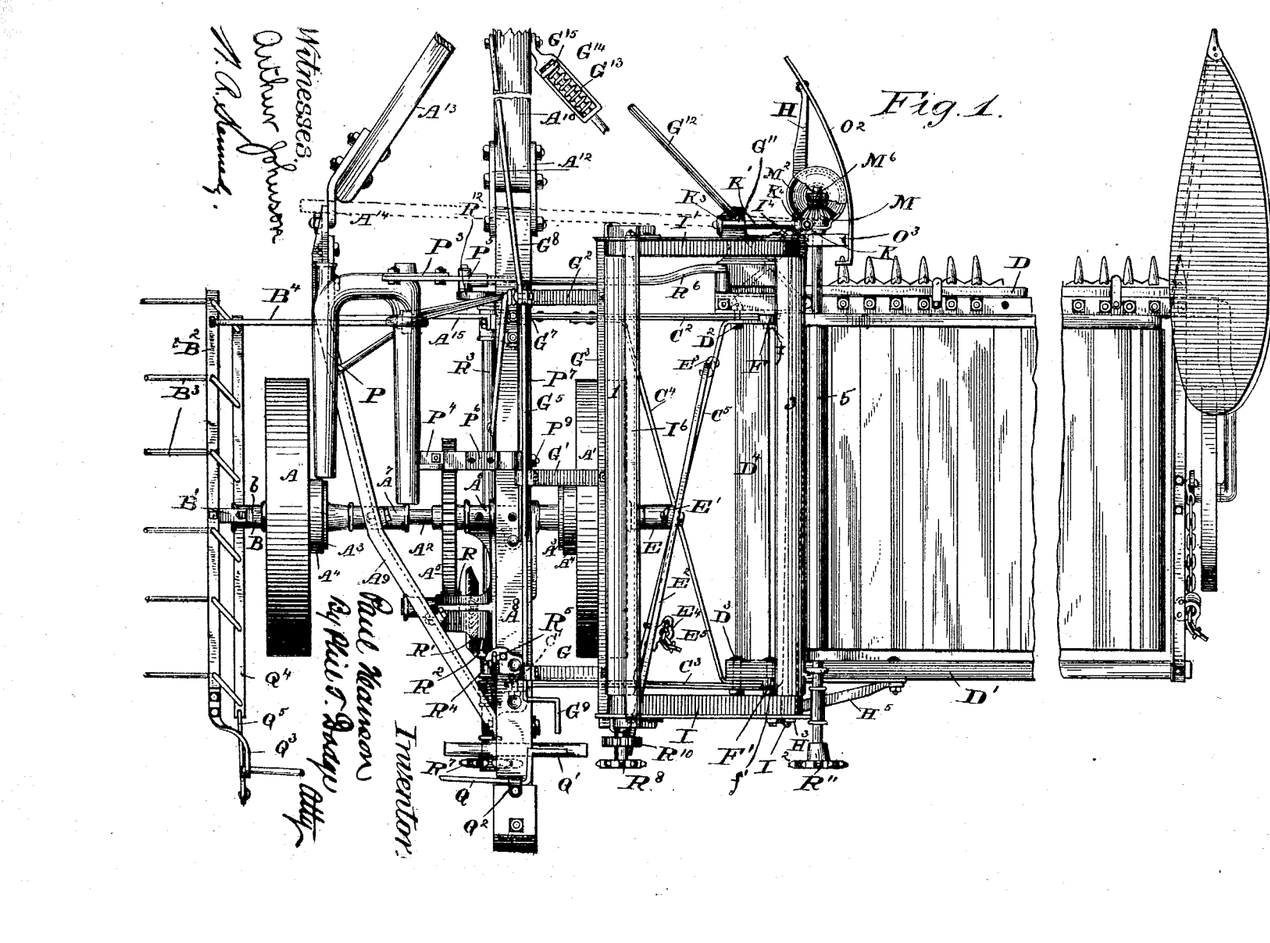
Figure 1 is a plan view of my machine, with the exception of certain details which are shown in other figures, and other details which form no part of the present invention.
Figures 13, 14:
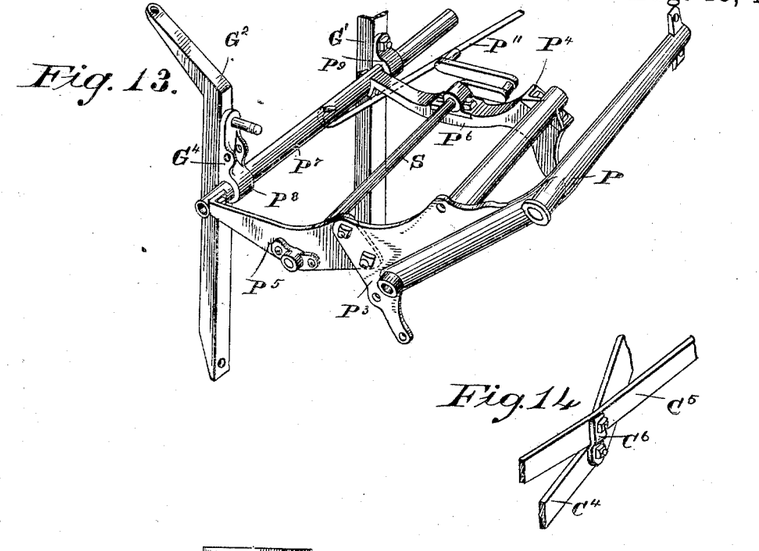
Fig. 13 is a perspective view, designed to show the construction of the binder frame, and the manner in which the binding attachment is supported.
Fig. 14 is a detail, which will be fully explained.

I support the grain platform and connect it to the main frame as follows: Beneath the sill A⁸ are the brackets C. and C', securely bolted thereto, each of said brackets being provided with lugs through which pivot bolts may pass. C² and C³ are bars pivoted at their stubble ends to the brackets C. and C', which are secured to the sill A⁸. These bars C² and C³ extend grainward and are pivoted respectively to the finger bar D., which also constitutes a platform sill, and to the rear platform sill D', by means of the bolts D² and D³, the bolt D² passing through the bar C² and through the vertical portion of the angled finger bar, as shown in Fig. 1. The bar C³ is pivoted to the platform sill D' in the same manner. I thus have a parallelogram, consisting of the bars C² and C³, and the sill A⁸, and the stubble end of the platform, the latter consisting, in addition to the finger bar D. and sill D', of the boards D⁴. Each of these bars C² and C³ is pivoted at its two ends, and the inner end of the platform is permitted to rise and fall relative to the main frame, but as I desire to have it rise and fall and retain its parallelism, with the main frame, I connect the two bars C² and C³ by means of the cross braces C⁴ and C⁵, which braces cross one above the other, near the middle of the length of each, and at the said middle I secure them together, as shown in Fig. 14, by means of a clip C⁶, and bolts. The bars C⁴ and C⁵ are riveted and bolted at their front ends and rear ends to the bars C² and C³. The parallelism of the bars C² and C³ is thus preserved. This last mentioned frame being pivoted to the main frame and also to the platform, the latter, as it rises and falls, is compelled to fall and rise at its rear and front at the same time and at the same rate.

Figure 3:
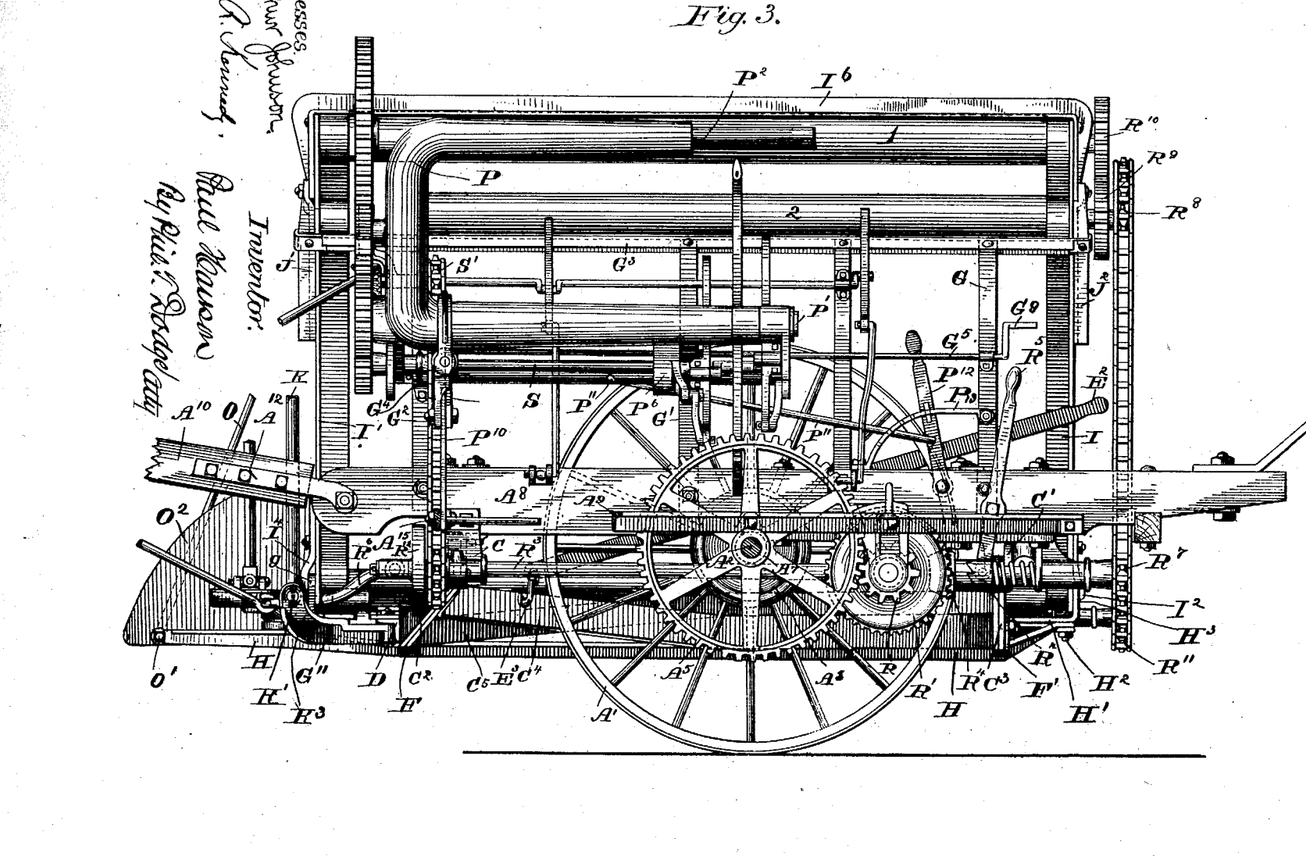
Fig. 3 is a stubble-side elevation.

In order to permit the platform to be sustained, I mount upon the grain end of the axle a bearing E., provided with a lug E', and to that lug, by means of a pivot bolt, I secure the lever E². The said lever extends both forward and rearward from the axle, and the forward end I connect to the forward end of the brace C⁵ by means of a link E³, as shown in Figs. 1 and 3. Upon the rearward extension of the lever I secure a clip E⁴, having a keyhole shaped aperture through it, as shown in Fig. 1, and from the point near the rear end of the bar C⁵, I pass a chain upward through this clip having the keyhole aperture.

The frame which connects the main frame with the platform may be raised and lowered by adjusting this lever. If it is wished to raise it, the rear end of the lever is moved downward, and the chain drawn taut through the hole in the clip E⁴, and locked by passing one of the links flatwise into the narrow part of the said slot. This portion of the frame I will term a coupling frame, because it serves to couple the inner end of the platform to the main frame.

Figure 12:
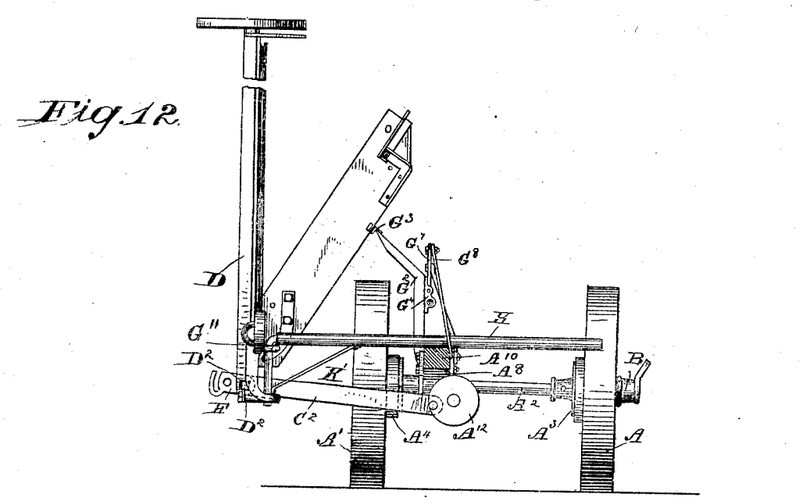
Fig. 12 is a front view of the machine folded.

As far as described, the stubble end of the platform will rise and fall only on the pivot bolts D² and D³, but in some conditions of grain it is desirable to have the platform and coupling frame as one piece, and allow for the rising and falling of the outer or grain end of the platform, through the pivot bolts which secure the grain end of the coupling frame, to the main frame. I hence so provide that the joints at these grain ends of the bars forming the coupling frame can be bolted rigidly thereto, and in order to do so, I secure the casting F. to the bar C², and F' to the bar C³, and provide in each a curved slot, as shown in Fig. 12. With the platform folded down, I pass bolts $f$. and $f'$ through the slots, and thus pinch the castings, each of which forms but a single piece with the bars C² and C³, tightly against the finger bar D. in front, and the platform sill D' in the rear. With the flexibility at the inner end of the platform thus destroyed, the chain E⁵ may be left loose.

The grain divider adjustment needs no description, as it is shown in the drawings to be of a kind which has recently come into prominent use.

In order to support certain parts of the binder and the elevator frame, I bolt to the grain side of the main sill A⁸, the posts G. and G' and G², and extend them upward and grainward, and secure to their tops a bar G³.

Figures 9, 10, 11:
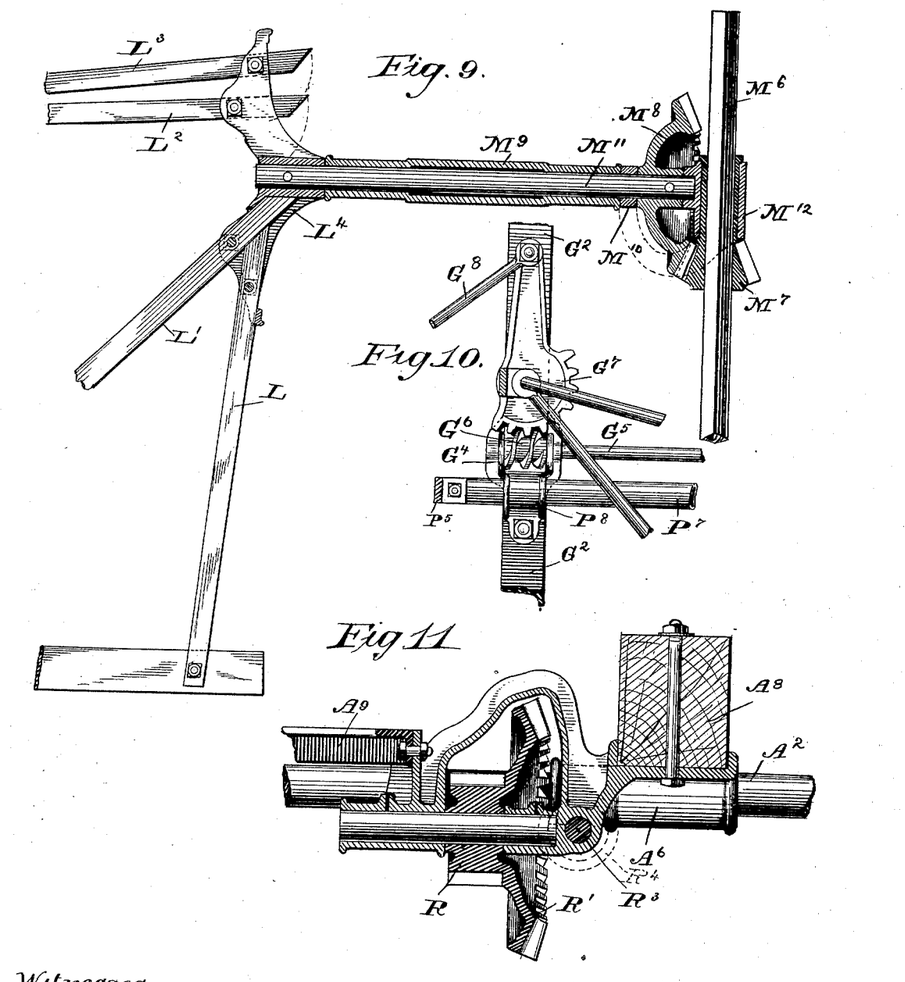
Fig. 9 is designed to show the construction of the reel whereby the arms of the same may be folded: and also the means for driving said reel.
Fig. 10 is a detail showing the means for tilting the machine.
Fig. 11 shows the arrangement of the main gearing for driving the machine, and supports for its shafts.

My tilting device is supported upon the post G², as shown in Fig. 10.

G⁴ is a casing in which the front end of the shaft G⁵ is journaled. Within this casing is a worm G⁶, keyed to the shaft G⁵. Immediately above this worm, meshing therein, and supported upon the casting which forms the casing G⁴, is a segment G⁷. This segment has an arm extending upward, to which is pivoted the rod G⁸. Upon the rear end of the shaft G⁵ is the crank G⁹, within reach of the driver, whose seat is immediately behind the main frame, the seat spring being shown in Fig. 3. The rod G⁸ passes downward and forward from the arm of the segment G⁷, and attaches to the tongue A¹⁰, as seen in Fig. 1. It is clear that if the crank G⁹ be rotated so as to turn the worm G⁶, the segment G⁷ will be rocked, and the position of the tongue, relative to the main frame, will be changed. The forward end of the tongue resting in the neck yoke of the team, and hence immovable, the finger bar can be tilted upward or downward at will.

Reference to Fig. 3 will show that the forward end of the platform is much lower than the pivots of the tongue to the main sill $A^8$ and bar $A^9$. Because of this variation from alignment, and because I wish to apply a portion of the draft from the team directly to the platform, so that the latter will not be moved forward wholly by strain brought upon the coupling frame, I connect the tongue to the main shoe $G^{11}$ (secured to the stubble end of the platform) by means of a brace $G^{12}$, as shown in Fig. 1, (the brace, however, being broken away, and the tongue being moved backward to show the point of the attachment of brace to the said tongue,) and as the inner end of the grain platform is raised or lowered, the eye in the shoe $G^{11}$ approaches or recedes slightly from the tongue, (because the pivots of the tongue, tongue brace and $G^{12}$ are not upon the same line,) as above stated. I make the brace $G^{12}$ extensible by forming it in two parts, the brace $G^{12}$ and the open link $G^{13}$. Within this link is the strong spring $G^{14}$. The brace $G^{12}$ extends through the end of this link, and through the spring, and takes the nut $G^{15}$. It will thus be seen that if undue stress be brought upon the brace $G^{12}$ by an adjustment of the platform, the spring will permit it to elongate.

Figures 5, 6, 7, 8:
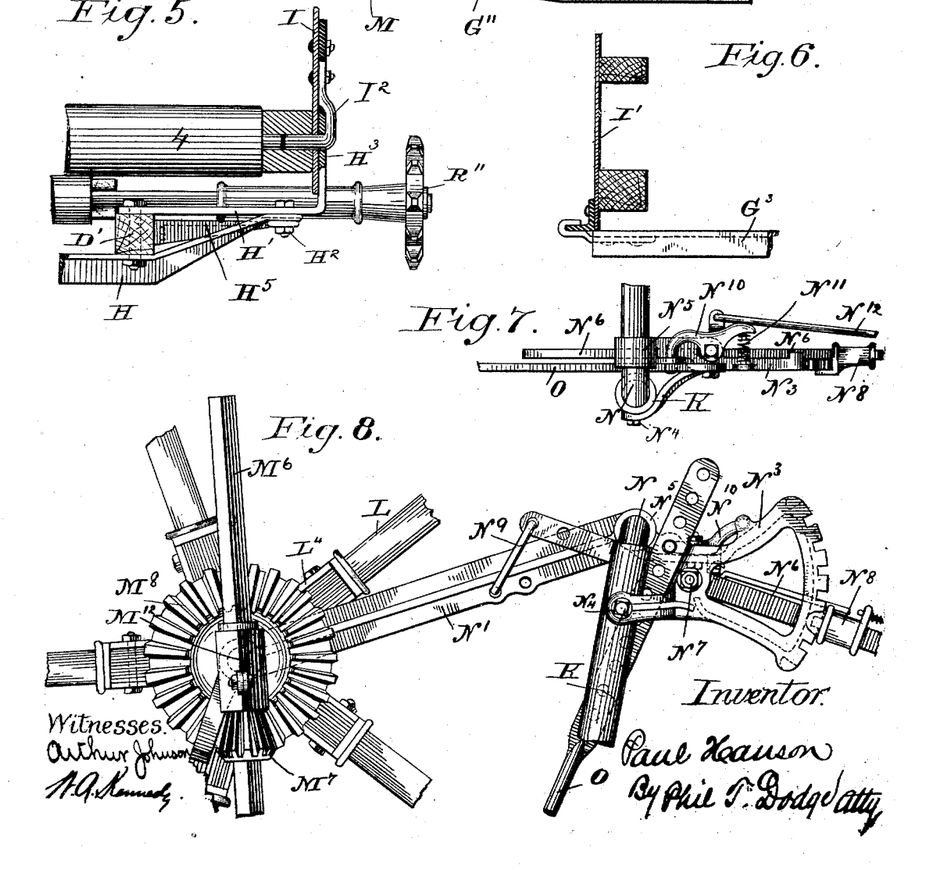
Fig. 5 is a detail showing the relative positions of the rollers of the conveying canvases and position of sprocket wheel for driving the same.
Fig. 6 is a detail showing the means whereby I connect the elevator frame to the supporting bar against which it leans.
Figs. 7 and 8 are details of the reel support and locking devices, to secure it in its various adjustments.

My elevating devices consist of the usual double endless canvases, and in order to support them thoroughly I secure to the stubble-end of the finger bar D., and to the stubble end of the platform sill D', the bar H., as shown in Fig. 3. This bar extends rearward of the platform sill D', and I bend it upward slightly, as shown in Fig. 5.

Figure 2:
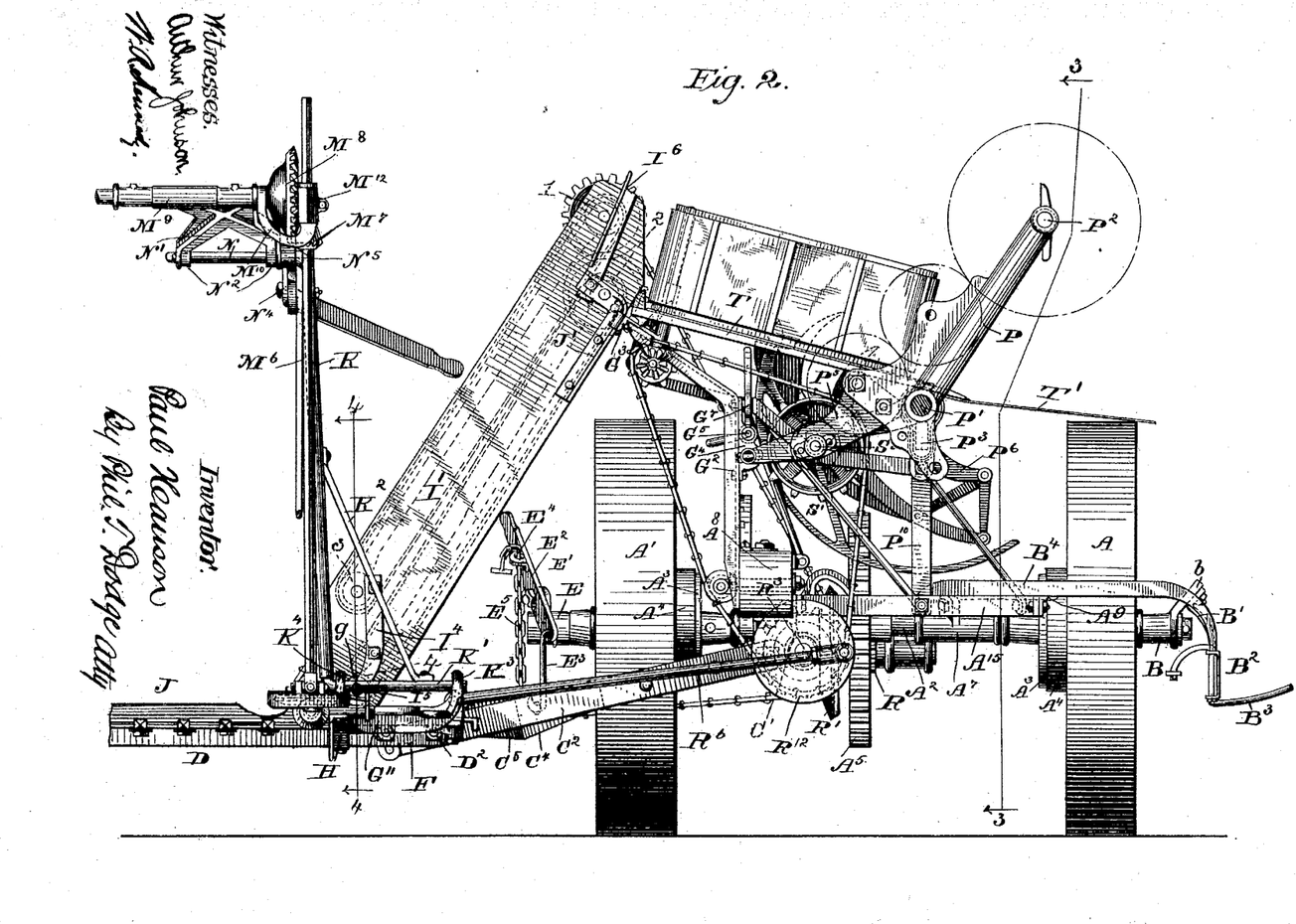
Fig. 2 is a front elevation of the same.

H' is a flat bar of metal secured to the rear sill and to the bar H. by means of the bolt $H^2$. It is bent upward at its rear end so as to form a lug $H^3$, which is provided with an eye and forms the means for pivoting the elevator frame to the platform, as will be seen in Fig. 5, where I. represents the rearmost board of the elevator frame, and, bolted to this, is the pivot piece $I^2$, secured by bolts to the said frame board I., and having a bent end adapted to enter the eye in the lug $H^3$. The said board is thus flexibly secured. The board I' is secured in precisely the same manner, by a pivot piece $I^4$, which is secured to the frame bar I', and its lower end adapted to form a pivot where it is bent into an eye $I^5$, in the main shoe $G^{11}$. The construction of this portion will be best understood by reference to Fig. 4, in which D. is the finger bar, and to it is secured the shoe $G^{11}$. The pivot by which the board I' is secured, consists of the lug g., preferably a casting, as one piece with the shoe $G^{11}$, but may be bolted thereto. The pivot piece $I^4$ is secured to the front board I' by bolts. The lower ends of the elevator frame boards are thus held in position. The upper ends are held from spreading asunder by an angle bar $I^6$, bent downward at each end, and bolted to the said boards, as shown in Figs. 2 and 3. This elevator frame is provided with rollers 1, 2, 3 and 4, as is the platform, and the grain is received and carried from the cutting apparatus in the usual manner. The frame for the elevators, as stated, is pivotally connected to the stubble end of the platform. This is so that the platform can be folded upward flexing upon the two pivots $D^2$ and $D^3$, as shown in Fig. 12.

In order that the grain receiving platform may be turned upward as high as possible, I cut out canvas slides J., as shown in Fig. 2, so that the said slides will not come into contact with roller No. 3.

The elevator frame is made to rest at its upper end against the bar $G^3$, and in order to prevent it from tipping over grainward, the said bar $G^3$ is extended, by pieces riveted thereto, both forward and to the rear, and then bent at each end into the form of hooks, which engage a flange on the angle pieces J' and $J^2$, as best seen in Figs. 2 and 3. The angular pieces J' and $J^2$ thus form guides, which slide up and down within the hooks formed upon the ends of $G^3$. As the platform is raised or lowered, the elevator frame is also raised and lowered, and although it slides up in the guides last referred to, its position relative to the platform is not materially changed, nor is its relative position to the binder, except in the mere matter of height.

K. is the reel post, preferably made of gas pipe, having its lower portion horizontal so as to form an axis K', upon which it may rock fore and aft.

$K^2$ is a brace connecting the horizontal and vertical portions, to render the same suitably stiff. The horizontal portion K', which forms in fact an axis, is provided with supports, formed by lugs $K^3$ and $K^4$ on the shoe $G^{11}$, and upon this axis the reel may be moved forward and rearward. As the main shoe is secured rigidly to the finger bar and the reel pivoted to the said shoe, when the finger bar and platform are folded upward, the reel post K. is folded over onto the tongue, as shown in Fig. 12. I there secure it by tying it to the tongue by any suitable method, but I prefer to use this means for locking the tilting bar $G^8$. In order to make this serve as a lock, I unbolt the said rod $G^8$ from its segment, before folding the platform, at its upper end, and swing it forward out of the way and then raise the outer end of the platform. The reel post is thus thrown over and compelled to lie upon the tongue. I then return the bar $G^8$ to place, bringing it down above the reel post, and replace the bolt. I do not limit myself to locking the reel post in this position in order to hold the platform when folded, by means of the bar $G^8$, as it may be locked in various ways. I shall, however, claim the bar $G^8$, and consider any equivalent lock for that purpose, to be covered by my claim.

It is clear that by prostrating the reel post upon the tongue I must so provide that the reel itself may be moved or removed, in some manner so as not to come in contact with the elevator frames. To accomplish this I so pivot the arms that they can be collapsed, as shown in Fig. 9.

The reel spider may have seats for any number of arms, but I so preferably construct them that the seat for each arm comes within a slot and pivot the arms therein, as will be seen by reference to Fig. 9, where L, L', L² and L³ are reel arms, which are pivoted by means of bolts to the reel spider L⁴, within the slot formed by giving each arm of the said spider two walls. I make the arms that are to support the outermost portion of the reel fans, as long, where it extends beyond the pivot bolt, as possible, so that it may rest upon the hub of the spider, and pivot the arms which support the inner end of the reel fans farther outward upon the arms of the spider, and make them of such length inward beyond the pivot bolt as to rest against the arms which support the outer ends of the fans, at a point nearer the hub than their pivot bolts.

The operation of folding and unfolding will be clearly understood by reference to Fig. 9. If the arm L³ be opened out, its shorter end will be moved in the path shown by the dotted line, and soon come in contact with the butt end of the arm L², and the continued movement of the arm L³ will not only straighten it to its position for receiving the fan, but will force the arm L² to its position for receiving the fan. The fan may then be bolted to the two arms L² and L³, when the whole will be held rigidly in position, as are those of L and L'. In order to collapse the reel, it is but necessary to remove the bolt which connects the stubble end of the fans, as that in L. in Fig. 9, when the said arms and fans may be folded down. They can then be all tied to the reel post, and thus in folding the platform the arms and fans will escape injury.

In order to give the reel rotation, and yet have it adapted to be folded without derangement of the driving mechanism, I extend the shaft of the roller No. 5 forward and provide it with a bevel pinion M. The journal of the roller No. 5 is provided with a bearing on the shoe G¹¹, secured immediately behind the bevel pinion. I provide a casing in the said shoe, in which the bevel pinion will turn, and also provide a case in which the bevel gear M² will revolve, and these recesses are cast as one piece with the shoe, but it is obvious that all of the various parts may be bolted together.

Figure 4:
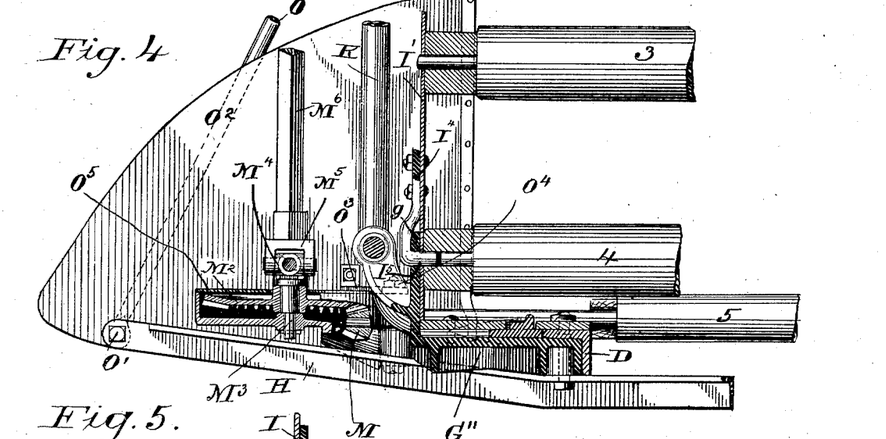
Fig. 4 is a vertical section, showing the means for driving the reel and supporting the same upon the front shoe, and also the relative positions of the rollers for the various conveying canvases.

M³ is a pivot bolt upon which the beveled gear M² rotates, the latter being driven by the beveled pinion M. The gear M² is provided with two lugs, as shown in Figs. 2, 3, and 4. Between these lugs is pivoted a swivel block M⁴, and spanning this block is a hub M⁵, into which a square reel-driving shaft M⁶ is thrust.

The parts consisting of the lugs on the beveled gear, swivel piece M⁴, and the hub M⁵, pivoted, form a universal joint of well known construction, and one that need not be described. In the combinations of post which I claim, I treat this universal joint as any one of the well-known forms of construction, and do not limit myself to that shown.

M¹⁰ is an arm having an eye surrounding the reel shaft M¹¹, at the base of the beveled gear M⁸, and passing around under and upward so as to form a bearing M¹², for the shaft M⁶; but as the shaft is square, it cannot in itself form a journal. Hence I extend a hub on the pinion M⁷ upward through the bearing M¹². I also shape the arm, to part of which I have given the letters M¹⁰ and M¹², so as to extend somewhat into the beveled gear M⁸ and permit the reel shaft at its stubble end to enter the same. The proper alignment of the shafts M⁶ and M¹¹ are thus maintained.

Upon the upper end of the reel post I form a horizontal axis N., by bending the gas pipe, or by inserting into it a bar of iron which may be bent to a horizontal position, so as to form an axis to mount the bracket N' upon and pivot it in N².

N³ is a quadrant bolted at N⁴ to the reel post, and is also provided with a sleeve N⁵, which is supported on the horizontal pivot N. N⁶ is the reel lever, pivoted at N⁷ to the said quadrant.

N⁸ is a latch adapted to engage the quadrant, and is operated by a thumb latch at the free end of the lever.

N⁹ is a link pivoted to the short end of the lever, and the bracket N'. As the lever N⁶ is raised and lowered, the bracket N', and hence the reel which it supports, is also raised and lowered.

To brace the reel post from moving forward or falling to the rear, I provide the brace O., pivoted at O' to the forward end of the bar H., as will be seen in Fig. 4, and extend it upward, and permit it to pass through a loose slot formed in the bracket N³, as shown in Figs. 7 and 8. This brace O. is provided with holes at its upper end, and to engage the same I provide a pawl N¹⁰, having a spring N¹¹ to force it to engage the holes in the brace O. This pawl is pivoted to the quadrant or bracket N³, and is provided with a lug, into which a rod N¹² is hooked. This rod passes to the free end of the reel adjusting lever, and is connected with a thumb latch, by pressure upon which the pawl N¹⁰ is disengaged and drawn from the holes in the brace O. By a pushing action upon the lever N⁶, the reel may then be moved forward, or by pulling moved to the rear. Releasing the pressure upon the thumb latch, the pawl is then permitted to engage any of the holes in the brace O. near which it may be.

Before folding the platform, it is not only necessary to collapse the reel, but to throw the reel post forward, and lower the reel as much as possible, thus getting the rear end of the lever to its highest point. With the reel lever in this position the platform may be folded, and the said lever pass over the elevator frames.

By referring to Fig. 3 it will be observed that the pivotal points of the reel post and brace O. are somewhat separated, so that when the brace O. is locked in the casting, (which also forms a quadrant, $N^3$,) by means of the pawl $N^{10}$, a triangle with fixed angles is provided, consisting of the reel post, the brace, and the bar H. and shoe. These parts thus form a rigid support for the reel.

I am permitted to fold my reel, because of placing the brace O. forward of the reel post, for if placed to the rear and footed to some portion of the machine, as for instance the rear part of the main frame, it would come in contact with the elevators when folding the platform upward.

I make the bar H. also serve as a support for the stubble side grain gatherer $O^2$, securing it also to the shoe by means of a bolt $O^3$.

$O^5$ is a plate of metal placed over the recess of the shoe to keep dirt out of the bevel gear which drives the reel.

In order to make the rear end of the bar H. as stiff as possible, I bolt to it a brace $H^5$, as shown in Figs. 1, 3 and 5.

P. is the binder frame, of the common U-shaped form of construction, having its parallel members made to be sleeves, through which passes the needle shaft $P'$ and the knotter driving shaft $P^2$. Upon the lower parallel member of this frame I cast a lug $P^3$, and at the forward end of the said frame I cast a lug $P^4$. To the lug $P^3$ I bolt an arm $P^5$, and to the lug $P^4$, the arm $P^6$. Both of these arms I bolt to a bar or gas pipe $P^7$. Upon the post $G^2$ is placed a bracket $P^8$, which is part of the casting $G^4$, and which not only serves as a bearing for the tilting crank shaft but is a slide for the bar $P^7$.

$P^9$ is a guide for the rear end of the bar $P^7$.

$P^{10}$ is a post secured at its foot to the bar $A^{15}$ of the main frame, and extending upward and provided with an antifriction roller at its upper end immediately below the binder frame, and on which the lower arm of the said binder frame rests. Through the bar or gas pipe $P^7$ and the post $P^{10}$, the binder frame is sustained in position, but is free to slide fore and aft.

$P^{11}$ is a link hooked at its forward end into a hole in the gas pipe $P^7$, and at its rear end pivoted to the lever $P^{12}$, which in turn is pivoted to the main sill $A^8$. By a movement of this lever fore and aft, the binder may be slid in the direction of the length of the grain, as required for central binding.

$P^{13}$ is a quadrant, formed by a flat bar of iron with notches on its edge, secured to a sill $A^8$, and to the post G. The lever $P^{12}$ is made thin so that it may be sprung sidewise and the tongue upon its side moved from engagement with quadrant $P^{13}$.

Q. is a shaft having a crank $Q'$, which serves as a pedal for operating the bundle carrier. The shaft Q. is supported at each end, in the bearings $Q^2$ and $Q^3$.

$Q^4$ is a connecting bar, into which all of the teeth of the bundle carrier are pivoted, and this bar is connected with a crank on the shaft Q. by means of a link $Q^5$. The pedal upon which the shaft Q. is located is immediately in front of the driver, in position to be operated by his feet.

The gearing for operating my machine consists of a spur wheel $A^5$, keyed to the axle, and adapted to mesh into the pinion R. Cast as one piece with the pinion is a bevel wheel $R'$, adapted to mesh into a bevel pinion $R^2$. This pinion is mounted on a shaft $R^3$, as is also the clutch $R^4$. This clutch is grooved and feathered to the shaft, and adapted to slide thereon, and a spring is provided to keep its teeth in engagement with those of the pinion $R^2$. The lever $R^5$ is provided by means of which the clutch is thrown out of engagement with the pinion, at will.

At the forward end of the shaft $R^3$ is a crank wheel $R^{12}$.

The knife is located as usual, and is reciprocated by a crank through the instrumentality of the pitman $R^6$.

Upon the rear end of the shaft $R^3$ is a sprocket wheel $R^7$. Upon the elevator roller No. 2 is also a sprocket wheel $R^8$. Upon the journal of the said roller is also a gear $R^9$, and upon the roller No. 1 is a gear $R^{10}$ meshing therein. Upon the rear end of the journal of the roller No. 5 is a sprocket wheel $R^{11}$. Along these sprocket wheels a chain is thrown, and the movement of the mechanism is thus imparted, from the main supporting wheels.

S. is the packer shaft of my binder, journaled in a bearing at its rear end in the arm $P^5$, and at its front end in the bearing bolted to the arm $P^6$. Upon this shaft is bent two cranks, as shown in Fig. 13. Upon this shaft S. is a sprocket wheel $S'$, which is adapted, by a clutching device of ordinary construction, to be locked thereto.

The construction and arrangement of the parts of my binder do not differ from some of those of ordinary construction, and need not be further described.

T. is a binder table constructed as in that type of machine known as the Appleby binder, but is provided with an extension $T'$, which serves to convey the bundles over the stubble side main supporting wheel.

What I claim as my invention, and desire to secure by Letters Patent, is—

1. The combination of the axle, the two ground-wheels A A', the main-frame sustained thereby, the grain-platform at the side of the wheel A', the coupling-frame consisting of the bars $C^2$ and $C^3$, relatively fixed and extending in front and in rear of the wheel A', the lever $E^2$, sustained by a horizontal fulcrum on the end of the axle, the link $E^3$, connected to one end of said lever and to the front end of the coupling-frame, the chain connected to the opposite end of the coupling-frame and means for connecting said chain at different points in its length to the free end of the lever.

2. The combination of the main-frame, the grain-platform coupled thereto to fold upward, the reel, the reel-post, sustaining the same and pivoted at its lower end on the grain receiving platform to swing forward and backward, the brace O, pivoted at its lower end in advance of the reel-post, and adjustably connected thereto at its upper end and the elevator frame in rear of the reel-post: whereby the latter may be first thrown forward to carry the adjusting lever clear of the elevator-frame and then folded down bodily as the platform is raised.

3. The reel post K, having the horizontal pivot N, the reel supporting bracket N' mounted thereon, the quadrant $N^3$ also secured thereto, the lever $N^6$ pivoted to the said quadrant, and connected to the reel-supporting bracket the adjustable brace O, and a latch, located upon the said quadrant, and adapted to lock the brace O thereto, whereby fore and aft and also vertical adjustments are produced, all combined substantially as described.

4. The combination of the axle, the ground-wheels, the main-frame, the platform hinged to fold upward, the bar H, extending in a fore and aft direction at the inner end of the grain platform and having its forward end extended beyond the same, the finger-bar and shoe mounted on said bar H, the reel-post pivoted at its lower end on the shoe, and the reel brace O, having its lower end pivoted to the forward end of the bar H, and its upper end adjustably connected to the reel-post.

5. The combination of the reel spider with the series of reel arms pivoted thereto in pairs and so arranged that the inner end of one of the arms of each pair engages its companion in such manner as to hold it against the spider.

6. The combination with the reel spider provided with a series of slots, of the arms L L' arranged in pairs and pivoted in said slots, the arm L' which supports the outer part of the fan, arranged to be engaged by the arm L, which supports the inner end of the fan and to bind said arm tightly against the spider.

7. The combination of the platform pivotally connected to the coupling frame, the reel pivoted to the said platform, and adapted to be folded therewith, and a locking device adapted to engage the reel post, and thereby lock the platform in an elevated position, substantially as described.

8. The combination of the coupling frame, the platform pivotally connected thereto, the reel post mounted upon the said platform and adapted to be folded over upon the tongue, in combination with the tongue brace $G^8$, serving as locking mechanism, to engage the reel-post and hold it and the platform in the folded position, substantially as described.

9. The combination of the main platform, having the canvas slide J, the said platform pivotally connected to the coupling frames, and also pivotally connected to the elevator frames carrying the roller 3, the said canvas slide J being cut away so as to permit the platform to be folded to a high position, substantially as described.

10. The main axle, the sheaf carrier finger supporting bar supported thereon, and the main frame also supported upon the main axle, and having the outreaching bar $B^4$ connected to the said finger supporting bar, all combined substantially as described.

11. The combination of the main frame, the coupling frame and the platform, the latter adapted to be raised or lowered to vary the height of cut, the tongue pivoted to the said main frame, and the elastically extensible brace $G^{12}$ connected to the said platform, and to the tongue whereby the variation in the distance from the point of the attachment of the brace to the tongue and the point of pivotal attachment to the platform resulting from a vertical adjustment of the latter is compensated for, substantially as described.

12. The combination of the ground-wheels, the axle, the main-frame mounted to rock thereon, the tongue pivoted to the forward portion of the main-frame, and the divided brace connected at its ends respectively to the tongue and the main-frame, and extensible longitudinally, and the spring connected to the two portions of the brace and tending to resist the longitudinal extension of the same.

PAUL HANSON.

Witnesses:
ARTHUR JOHNSON,
A. L. UPTON.